June 28, 1932.  C. H. KUHLMAN  1,864,744
HUMIDITY AFFECTED TELETHERMOMETER
Filed March 3, 1928  2 Sheets-Sheet 2
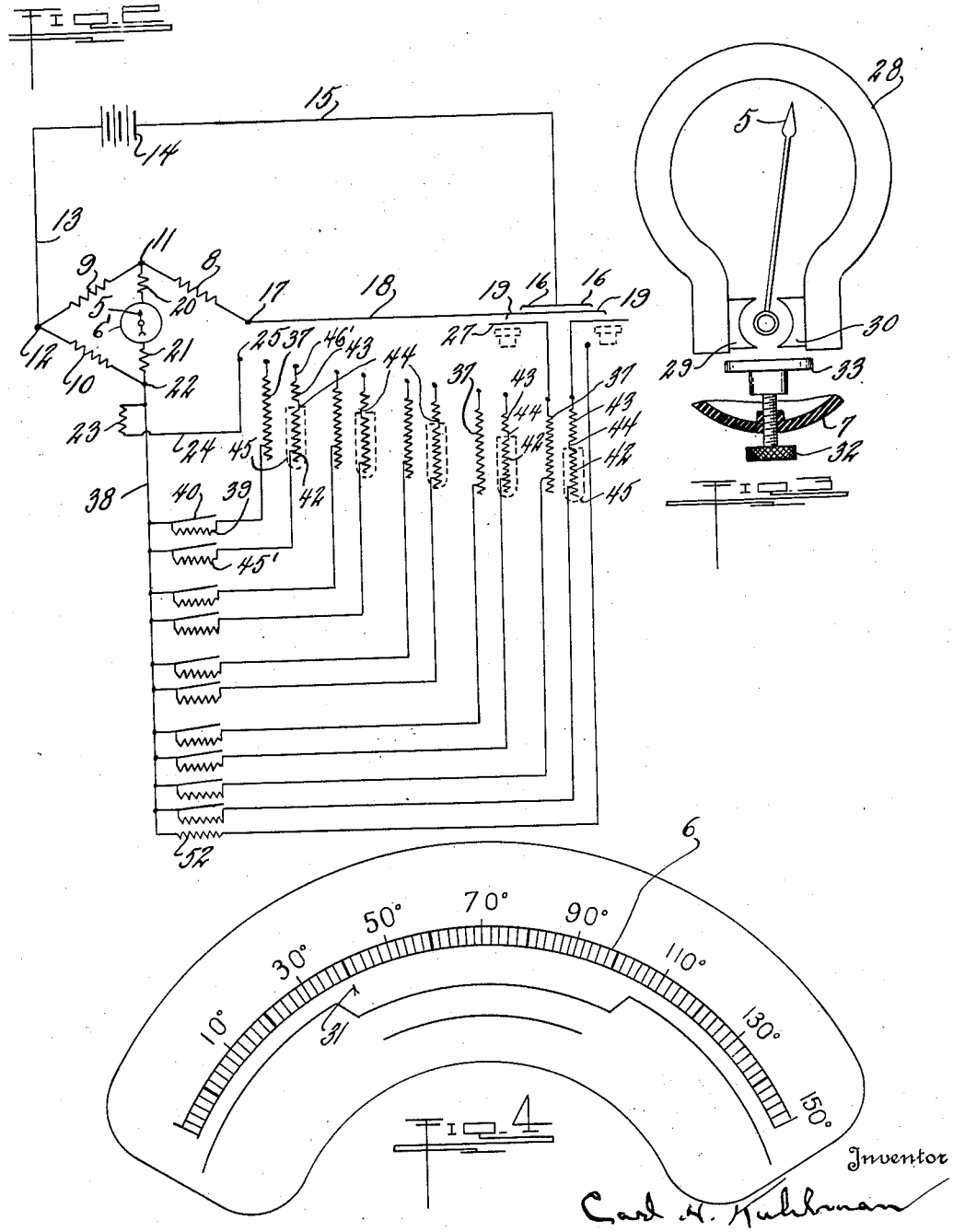

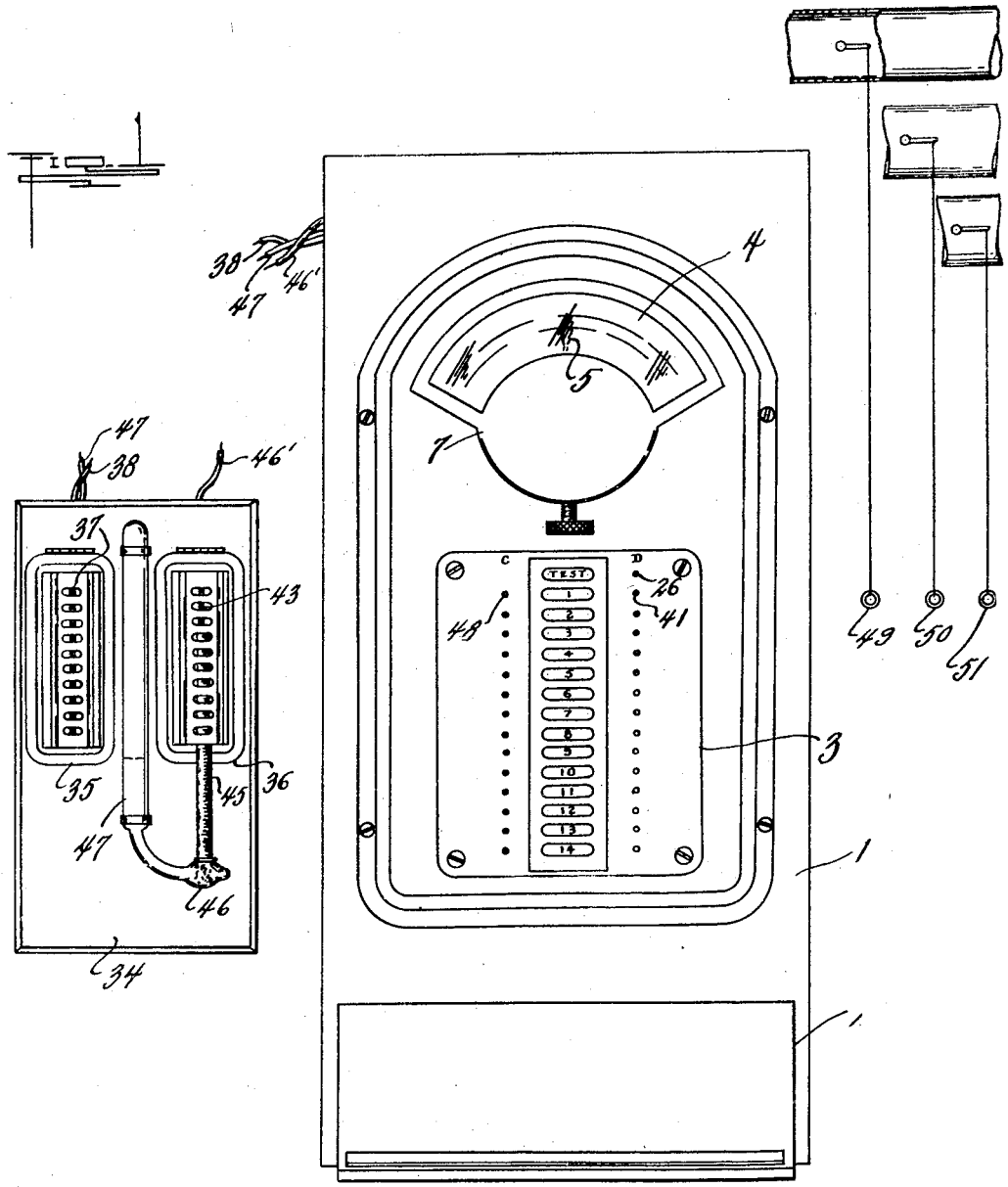

Patented June 28, 1932

1,864,744

UNITED STATES PATENT OFFICE

CARL H. KUHLMAN, OF TOLEDO, OHIO, ASSIGNOR TO THE AMERICAN TEMPERATURE INDICATING COMPANY, OF TOLEDO, OHIO, A CORPORATION OF OHIO

HUMIDITY AFFECTED TELETHERMOMETER

Application filed March 3, 1928. Serial No. 258,895.

This invention relates to telethermometers for checking dry condition at remote places, more especially as to temperature and the comfort condition incidental to humidity.

This invention has utility when incorporated in central station electrical instruments having remote wet and combined dry and wet temperature responsive resistances in circuits for the different remote places.

Referring to the drawings:

Fig. 1 is a fragmentary view of an embodiment of the invention showing the central station instrument and controls as well as a remote station device;

Fig. 2 is a wiring diagram of an installation as shown in Fig. 1;

Fig. 3 is a fragmentary detail view of the adjusting means for bringing the indicator of the instrument to the desired initial position on the scale of graduations; and Fig. 4 is a view of the scale of graduations.

Central station housing 1 is shown as provided with desk 2 and panel 3. Above the panel 3 is located window 4 through which may be observed indicator 5 as shiftable across scale 6 herein shown as having graduations responding to degrees Fahrenheit of temperature. This needle 5 is of galvanometer instrument 6' herein shown as mounted in insulation case 7.

The device is here shown assembled in Wheatstone bridge having known resistance legs 8, 9, 10 with junction 11 between the legs 8, 9, and junction 12 between the legs 9, 10. From this junction 12 extends line 13 to energy source 14 say storage battery with line 15 therefrom to spring terminals 16 as a pair. From the resistance 8, remote from the junction 11 is junction 17 from which extends line 18 to pair of spring terminals 19 in proximity to but normally clear of the spring terminals 16.

From the junction 11 through resistance 20 there is connection to the galvanometer 6. This places the resistance 20, as well as resistance 21 from the galvanometer 6 to junction 22, in series with this measuring instrument 6 in the Wheatstone bridge. From the junction 22 there is standard or check resistance 23 having line 24 to test terminal 25 so that insulated push button 26 at the panel 3 may, upon operation, thrust spring terminal 27 against spring terminals 19, 16, for connecting in the energy source and completing the circuit for the leg 23 resistance of the Wheatstone bridge, in determining a standard test condition for the indicator 5 as to the condition of the battery or energy source 14.

As herein shown this indicator 5 is disposed in the insulation housing 7 with permanent electro-magnet 28 having poles 29, 30, in the region of the mounting of the indicator 5 as a magnetic drag to minimize oscillation of the needle 5, when coming to readings on the scale of graduations 6. In the event this instrument be used for refrigeration or low temperature work, it is in order to have the test point for this indicator in the region wherein the major number of readings are to be had, or say at point 31 on the scale. This is desirable in the region of the normal position for the needle, to the end that the needle or indicator 5 in coming to rest may not strike an abutment and thereby create, by impact, reactions detrimental to the delicacy of its operation.

On adjusting screw 32 through insulation housing 7 or case for the galvanometer, there is mounted armature 33. Approaching or receding of this armature 33 as to the poles 29, 30, affects the magnetic flux between the poles 29 and 30 and their reaction upon the control of the indicator 5 in such a manner that the throw of this indicator is thereby adjusted and this set screw 32 is accordingly a means for bringing the needle 5 say to the test point 31 when the push button 26 is depressed for the test operation.

The resistances 20, 21, in series with the galvanometer are additional factors for controlling the indicator 5 and have especial value in determining approximately uniform spaced positions for the indicator 5 along the scale for uniform variations in the resistances. It is thus a factor in having the graduations 6 uniform.

At remote places, say in locations about a public building, auditorium, amusement hall, school buildings of many rooms, or office buildings, there may be located for each room, or in different locations in the room, instrument board 34 herein shown as having panels having housings 35, 36. Housing 35 has its open work to permit free access of air for temperature responses of resistance 37. From the junction 22, line 38 extends to the instrument board 34, past normal adjusted loading resistance 39 to the temperature varied resistance 37. Switch 40 on the instrument 34 may in emergency or especial test be cut in for checking the definite condition of the temperature responsive resistance 37. The resistance 39 may be a balancing resistance for the several remote places. Accordingly, pressing of push button 41 may disclose on the scale 6 a dry or normal temperature reading at the central station 11 by closing the circuit between spring terminals 27, 19, 16, for a remote place to cut in the bridge and energy source with this fourth leg of the bridge. As shown in Fig. 1, there is a row of plugs 41. Each of these plugs is adapted to close a circuit connecting terminal 17 with one of the dry resistances, and a similar row of plugs 48 for the wet resistances. Also there are special plugs for resistances 23, 52.

The instrument board 34 additionally carries resistances 42, 43, in its summation totaling the resistance 37 but having definite demarkation line 44 therebetween. The resistance 42 is humidity responsive, and is herein shown as covered with a stocking or knitted element 45 as a vaporization envelope, the rate of which is affected by the humidity in the atmosphere. This envelope 45 has extension from the resistance into water cup 46 from reservoir 47. In practice it has been determined that 45% humidity is one promoting comfort condition for human beings. This may be varied for different conditions or in connection with individual operations as to desired humidity conditions to be maintained, as for handling textiles, etc. However, taking the instance of 45% humidity, the 100% resistance of the temperature responsive portion 43, 44, as equalizing the resistance 37 has as to these resistances 42, 43, a ratio in excess of 45% for the resistance 42.

In practice, applicant prefers, in certain range of conditions, to place the ratio as two parts in the resistance 42 to one part in the resistance 43, while in other conditions, the ratio between the parts 42, 43, is as four to three instead of two to one. The line 38 has a branch in the instrument 34 past resistance 45' similar to the resistance 39 to the resistance 42 and these resistances 42 and 43 are in series as ratio determining for the humidity response and extend by line 46' to the central station instrument 1 in parallel with line 47 from the resistance 37 for the push button 41 reading. Accordingly, by operating a push button 48 at the central instrument 1, there is disclosed a direct comfort condition reading at the scale 6. This avoids any necessity for computation upon the part of the attendant, who for the same remote place may at once operate the push button for the dry or normal reading. If the dry reading be low, then the operator knows that more heat is required, while if the dry reading be high, the operator then knows that increased humidity is in order. Accordingly, this would mean, if the heating condition were to be increased, that the operator would operate control 49 to permit additional supply of temperature to the remote place and leave humidity control 50 undisturbed and likewise not disturb the dry control 51.

In addition to test, local to the region of operation of the needle 5, herein shown as central of the scale 6, it is, in practice, frequently desirable to have a position for test away from said position of use, and to this end resistance 52 is provided say to give proper check resistance for the needle 5 at 150° point on the scale 6.

What is claimed and it is desired to secure by Letters Patent is:

1. In combination a wet and dry ratio direct temperature electrical responsive instrument for a remote location, a scale, a galvanometer provided with indicating means coacting with said scale, and independent optionally operable connections therefrom to the scale for ascertaining a direct disclosure at the scale of the instrument responses.

2. In combination a wet and dry ratio direct temperature electrical responsive instrument for a remote location, an additional unitary electrical responsive instrument, a central station, electric connections from the instrument first named to the central station for ascertaining a direct disclosure of the instrument temperature humidity response, electric connection means from the second named instrument to the central station, said central station including a scale of graduations, and a galvanometer provided with indicating means coacting with said scale.

3. In combination a wet and dry comfort direct temperature electric responsive instrument for a remote location, electric connections therefrom for ascertaining a direct disclosure of the instrument temperature humidity response including a scale of graduations, a galvanometer provided with indicating means coacting with said scale, an additional unitary electric response instrument, and electric connections from the unitary instrument for galvanometer indication at the 4. A wet and dry ratio direct temperature scale as departing from the comfort instru- 4. A wet and dry ratio direct temperature electric responsive instrument comprising in series a pair of resistances, said resistances having a predetermined ratio therebetween, and a humidity responsive envelope for one of said resistances.

5. A wet and dry comfort ratio direct temperature responsive instrument on 45% humidity basis comprising a pair of resistances in series totaling 100% for normally dry temperature indication, one of said resistances being humidity responsive and in excess of 55% of the total of said resistances.

6. A wet and dry ratio direct temperature responsive instrument on a pre-selected humidity basis, comprising a pair of resistances in series totaling 100% for normal dry temperature indication, one of said resistances being humidity responsive and the greater by at least 15% of the total resistance.

7. A wet and dry temperature instrument comprising a predetermined humidity directly-responsive resistance, a similar resistance independent of humidity response, a central station, connections from the station to said resistances, and controllable means at said station for selectively placing said resistances in circuit with said station.

8. A wet and dry temperature instrument comprising a predetermined humidity directly-responsive resistance, a similar resistance independent of humidity response, a central station provided with a galvanometer having an indicator, a graduation-carrying scale for the galvanometer, connections from the station to said resistances, and controllable means at said station for selectively placing said resistances in circuit with said station for thereby directly obtaining the dry responsive indication and the predetermined humidity response.

9. A wet and dry temperature instrument comprising a predetermined humidity directly-responsive resistance, a similar resistance independent of humidity response, a central station provided with a galvanometer having an indicator, connections between the resistances and galvanometer, and a graduation-carrying scale for the galvanometer, said galvanometer including a magnet for minimizing indicator oscillation.

10. A wet and dry temperature instrument comprising a predetermined humidity directly-responsive resistance, a similar resistance independent of humidity response, a central station provided with a galvanometer having an indicator, connections between the resistances and galvanometer, a graduation-carrying scale for the galvanometer, said galvanometer including a magnet for minimizing indicator oscillation, and an adjustable armature for the magnet for affecting test adjustment of the indicator as to the scale.

11. A wet and dry temperature instrument comprising a predetermined humidity directly-responsive resistance, a similar resistance independent of humidity response, a central station provided with a galvanometer having an indicator, connections between the resistances and galvanometer, a graduation-carrying scale for the galvanometer, said galvanometer including a magnet for minimizing indicator oscillation, and a series of resistances for the galvanometer to supplement magnet action for further minimizing indicator oscillation.

In witness whereof I affix my signature.

CARL H. KUHLMAN.

CERTIFICATE OF CORRECTION.

Patent No. 1,864,744.  June 28, 1932.

CARL H. KUHLMAN.

It is hereby certified that error appears in the printed specification of the above numbered patent requiring correction as follows: Page 2, lines 125 and 126, strike out "4. A wet and dry ratio direct temperature scale as departing from the comfort instru-" and insert instead as part of claim 3, scale as departing from the comfort instrument indication.; and that the said Letters Patent should be read with these corrections therein that the same may conform to the record of the case in the Patent Office.

Signed and sealed this 4th day of October, A. D. 1932.

(Seal)

M. J. Moore,
Acting Commissioner of Patents.